Figure 1:
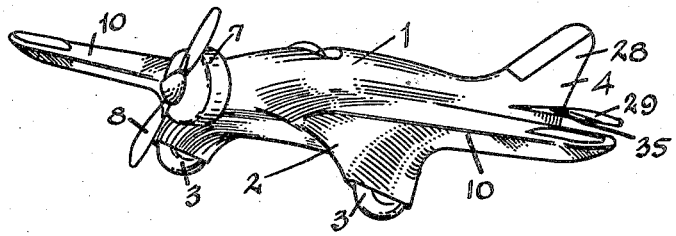

Aug. 9, 1938.   F. A. REDLINGER   2,126,502
AIRFOIL
Filed April 3, 1934

Inventor
Frank A. Redlinger
By Faust F. Crampton
Attorney

Patented Aug. 9, 1938

2,126,502

UNITED STATES PATENT OFFICE 2,126,502

AIRFOIL

Frank A. Redlinger, Erie, Mich.

Application April 3, 1934, Serial No. 718,819

2 Claims. (Cl. 244—35)

My invention relates to the construction of aircraft of the heavier-than-air type. The invention particularly relates to an airplane construction having a reduced structural and wing drag, when in motion through the air, and thereby provides a construction in which the thrust power utilized to overcome parasite drag is greatly reduced.

My invention has for an object to provide an airplane construction having fuselage and wing surfaces of such form and interrelation that the parasite drag thereof is materially reduced, and the characteristics of sustentation and lift are greatly increased. Another object of my invention is to provide an airplane construction having a wing structure of an increased coefficient of lift and a decreased coefficient of wing-drag thereby increasing the lifting efficiency of the airplane.

My invention has for a still further object to provide an airplane construction having a wing structure of comparatively great structural strength, which, when the airplane is moved relative to air, will create little turbulence of the air of a retarding nature about the wing. A still further object of my invention is to provide an airplane construction having a single wing structure of dual lifting and sustentation surfaces disposed in tandem or following relation to each other with respect to an air stream induced by movement of the airplane, and so as to come into activating and sustaining position, with respect to said air stream, more or less, upon a change of angular movement of the airplane with respect thereto, thereby maintaining a sustaining pressure area regardless of variations of an angle of attack of the wing with respect to said air stream.

The invention has for a further object to provide an airplane construction having tail elevator members connected to the leading or entering edge of stabilizer foils to permit greater maneuverability to the airplane and decreased risk of operation. Another object of the invention is to provide a tail fin having a rudder disposed forwardly of the tail fin and adapted to be moved angularly with respect thereto.

A particular object of my invention is to provide a wing structure having associated sustaining surfaces disposed so that the turbulence created in an air stream about the wing, during movement of the wing, tends to have a sustaining effect thereon with substantially no drag or retardence of forward movement. A further particular object of the invention is to provide a wing structure having an under camber surface normally positioned in flight to effect a lifting and requisite sustentation and a second under camber surface adjoining the first named under camber surface and disposed so as to come into a position of sustentation when the wing structure is moved, as a whole, angularly about its axis, as when the airplane on which it is mounted goes into a sharp climbing position from a position of normal horizontal flight.

The invention consists in other features and advantages which will appear from the following description and upon examination of the drawing. Structures containing the invention may partake of different forms and still embody the invention. To illustrate a practical application of the invention, I have selected an airplane construction as an example of the various structures and details thereof that contain the invention and shall describe the selected airplane construction hereinafter, it being understood that variations may be made without departing from the spirit of the invention. The particular airplane construction selected is shown in the accompanying drawing and described hereinafter.

Figure 2:
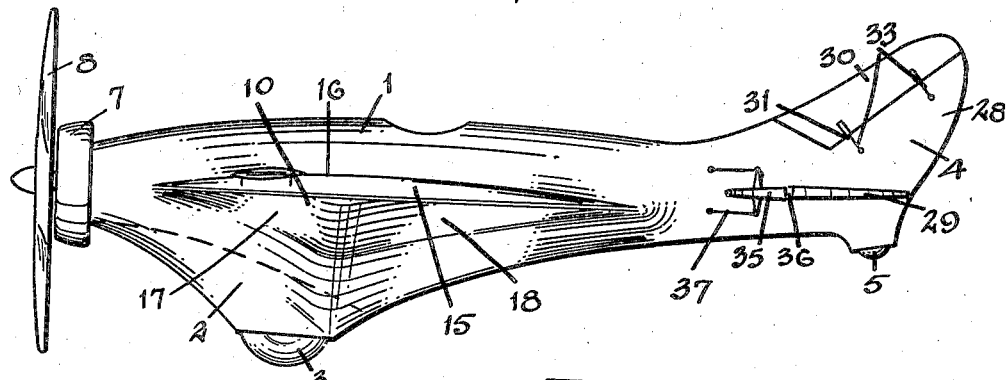
Figure 3:
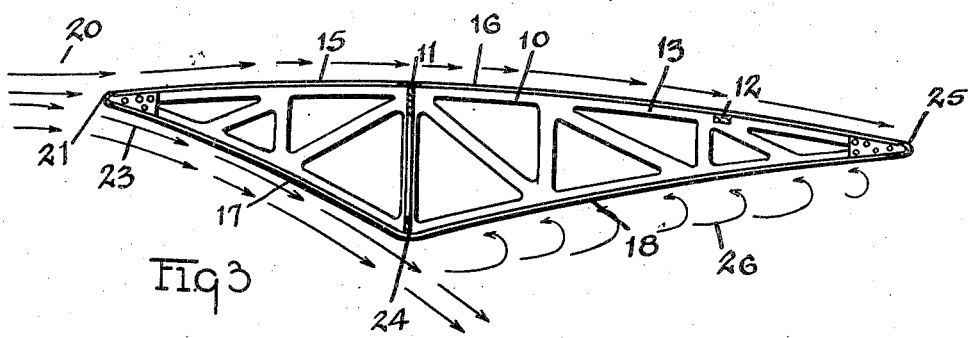

Fig. 1 illustrates a view in perspective of the airplane construction chosen for purposes of illustration. Fig. 2 illustrates a side view of the airplane construction shown in Fig. 1. Fig. 3 illustrates a section of the wing of my invention disposed at a normal flight angle of attack.

An embodiment of my invention has a fuselage provided with a suitable undercarriage and power unit mounted therein. Extending from either side of the fuselage is a wing disposed to traverse the air stream induced by the power unit and by relative movement of the fuselage through the air. Each wing has a cambered upper surface of a substantially unbroken, almost flat convexity in form throughout its width, when viewed in section. Each wing has a pair of lower or under cambered surfaces disposed adjacent to each other and extending from a protruding ridgelike, joining portion. Each of said under surfaces are evenly concave in form, with regard to a section of the wing, and the protruding portion being relatively angular in form. The wing portion on the leading side of the protruding ridge-like portion forms with the upper cambered surface an entering edge, and the portion on the other side forms with the upper surface a trailing edge. The mean or average plane of the under surface adjoining the entering or leading edge is located, in a normal flying position of the wing, at a sharp angle of attack relative to the air stream and diverges away from the upper surface forming a sharp entering edge. The mean or average plane of the under surface adjoining the trailing edge is located at an angle to the normal line of air current and progressively approaches in its width the mean average plane of the upper surface forming a sharp trailing edge.

The fuselage has a tail portion on which may be mounted an empennage consisting of a fin and a pair of stabilizer foils. An elevator is disposed on the entering edge of each of the stabilizer foils and is adapted to be moved angularly with respect thereto by suitable control wires operable from the fuselage by an operator of the airplane. The fin has a rudder mounted forward of the leading edge thereof and adapted to be moved angularly with respect thereto by suitable control wires operable from the fuselage by an operator of the airplane, in the same manner.

In the particular construction illustrated in the drawing embodying my invention, the airplane preferably has a stream-line fuselage 1 mounted on a suitable housed undercarriage 2 having wheels 3 partially housed by depending skirt portions of the carriage 2. The fuselage has a tail portion 4 which is mounted on a partially housed skid wheel 5. The airplane has a suitable power unit comprising a motor 7 and a propeller 8 mounted forward of the fuselage and adapted to induce an air stream about the fuselage and its interrelated parts and exert sufficient thrust to move the fuselage through the air.

On either side of the fuselage 1 is suitably mounted a wing 10. Each wing 10 extends so as to traverse air stream currents induced by the propeller or caused by relative movement of the fuselage through the air. Each wing 10 has a supporting interior frame comprising a fore spar 11 and an aft spar 12, to which are connected suitable ribs 13. Extending across the ribs 13 and held in form thereby is the wing fabric 15 forming the wing upper and under surfaces. The ribs 13 are so formed that the fabric 15, when placed thereon, forms an upper surface 16 and a pair of under surfaces 17 and 18. The upper surface 16 extends fore and aft on the wing in relatively constant arcuate convexity of a relatively large radius so that the surface 16 is almost flat or in plane parallel with the horizontal when the wing is in a normal flying position. Thus, an air stream, as indicated by the arrow 20 in Fig. 3, will pass, in the normal horizontal flight position of the wing, over the major extent surface 16 with the exertion of no parasite drag, other than the ordinary skin drag, yet providing an extensive area of potential actuating wing surface available upon a change of angle of the wing from the normal angle of attack.

The under surfaces 17 and 18 are disposed in tandem or following relation to each other with reference to the air stream, the surface 17 being in advance of the surface 18. The minor extent surface 17 is cambered to a positive concave form and forms with the upper surface 16 a sharp entering or leading edge 21. The radius of the concavo-surface 17 is shorter than the radius of the convexo-surface 16, thereby giving a greater degree of curvature to the surface 17 than to the surfaces 16 and 18. The surface 17 extends from the entering edge 21 aft, with a gradually increasing angle to the average plane of the surface 16, to a point substantially equal to two-fifths of the depth of the wing or of the length of a chord of the arc described by the cambered surface 16. Thus, an air stream, approaching the surface 17, will be diverted, as indicated by the arrow 23 in Fig. 3, downwardly. The diverting force has a lifting component which tends to lift the wing 10 upwardly or in a direction away from the direction of diversion.

The intermediate extent surface 18 constitutes three-fifths of the under pressure area and adjoins the surface 17 having intermediate thereto a ridge portion 24. The surface 18 is concave with respect to the wing section and extends rearwardly in decreasing angular relation to the surface 16. The surfaces 18 and 16 form together, therefore, a sharp trailing edge 25. The line from the spar 11 to the point, ridge portion or juncture 24 is approximately normal to the chord line between the leading edge 21 and the trailing edge 25. This chord is normally in the line of flight for the plane and lies entirely within the wing body. The point or juncture 24 is at the maximum thickness of the wing a greater distance from the chord line between the leading and trailing edges than the maximum distance of the convex upper surface from such chord line. This line of intersection with the chord is approximately in the range of maximum wing thickness and intersects the chord a greater distance from the leading edge 21 than the length of this wing thickness line 11, 24. The ridge portion interjointure or junction 24 extends longitudinally with respect to the wing from the fuselage to substantially the wing tip and causes, when the wing is moved through the air, displacement of air in the air stream with a resultant turbulence of air, as indicated by the arrows 26, in the space immediately following said ridge portion. The air, thus set in a turbulent state, will exert itself on the surface 18 tending to buoy the wing and effect considerable sustentation. Thus, it will be seen that the surface 17 is primarily a lifting surface with a potential sustentation characteristic and the surface 18 is primarily a sustentation surface with a potential lifting characteristic when located at an angle of attack of normal flight.

It will be appreciated that upon angular changes of the wing from a normal flight angle of attack, the surfaces 17 and 18 will perform different flight duties and exert various pressure characteristics on the air stream. Thus, supposing the airplane on which the wing of my invention is mounted moves into a sharp climbing position, the surface 18 not only acts to sustain the fuselage, but also tends to actuate as a lifting surface. Further, should a stall take place when the airplane is in said sharp climbing position, the surface 18 will present sufficient area of pressure to the air stream as to move the airplane into a normal horizontal flying position by reason of the air pressure exerted on said surface and thereby cause the airplane to go into a glide. Supposing further, the airplane moves into a diving position or is being grounded, the surface 17, in diving, tends to lift the entering edge of the wing to the normal angle of attack or in grounding tends to brake the speed by resistance directly to the air current. Consequently, the wing of my invention materially reduces the peril of air traffic as well as reducing the parasite drag and increasing the soarability of the airplane.

In order to control and direct the movements of the fuselage through the air, the fuselage has a tail unit comprising a vertical fin 28 and a pair of stabilizer foils 29 mounted on the tail portion 4. The fin 28 has a rudder 30 mounted, as at 31, on the entering edge of the fin. The rudder 30 is angularly movable relative to the fin about its mounting 31 and is caused to so move by suitable control wires 33 which may be manipulated by an operator of the airplane. By so locating the rudder 30 on the entering edge of the fin, a greater sensitivity of control is obtained together with an increased maneuverability.

On each stabilizer foil 29 an elevator 35 is mounted, as at 36, so as to extend forwardly from the entering edge of the stabilizer. Each elevator 35 is adapted to be angularly moved with respect to its associated stabilizer foil 29 by means of suitable control wires 37 manipulatable by the operator. As in the case of the rudder 39, the locating and manipulating of the elevators 35 in a position in advance of the entering edge of the particular stabilizer associated therewith greater sensitivity and maneuverability is obtained.

I claim:

1. An airplane wing throughout its major extent having a convex upper surface between the leading and trailing edges determining therebetween a chord in the line of flight entirely within the wing body, a lower forward concave surface extending downwardly and rearwardly from the leading edge of the wing of greater degree of curvature than the convex upper surface, and a rearward concave surface extending downwardly and forwardly from the trailing edge of said wing and to a juncture with the forward downwardly extending surface at a point which is substantially two-fifths of the chord length of the wing from the leading edge, said point being located a greater distance from the chord than the maximum distance of the convex upper surface from the chord, the line of maximum wing thickness from said point intersecting the chord a greater distance from the leading edge than the length of said wing thickness line.

2. An airplane wing throughout its major extent having a convex upper surface between the leading and trailing edges determining therebetween a chord in the line of flight entirely within the wing body, a lower forward concave surface extending downwardly and rearwardly from the leading edge of the wing, and a rearward concave surface extending downwardly and forwardly from the trailing edge of said wing and to a juncture with the forward downwardly extending surface at a point which is substantially two-fifths of the chord length of the wing from the leading edge, said point being located a greater distance from the chord than the maximum distance of the convex upper surface from the chord, the line of maximum wing thickness from said point intersecting the chord a greater distance from the leading edge than the length of said wing thickness line, and the lower forward concave surface being of greater degree of curvature than the degree of curvature of the convex upper surface and than the degree of curvature of the rearward concave lower surface.

FRANK A. REDLINGER.